US012677859B2

(12) United States Patent
Takahagi et al.

(10) Patent No.: US 12,677,859 B2
(45) Date of Patent: Jul. 14, 2026

(54) POWDERED SOY SAUCE AND PRODUCTION METHOD THEREOF

(71) Applicant: Kikkoman Corporation, Chiba (JP)

(72) Inventors: Yasushi Takahagi, Chiba (JP); Hiromi Okabe, Chiba (JP); Yasutaka Hashioka, Chiba (JP)

(73) Assignee: KIKKOMAN CORPORATION, Chiba (JP)

( * ) Notice: Subject to any disclaimer, the term of this patent is extended or adjusted under 35 U.S.C. 154(b) by 301 days.

(21) Appl. No.: 18/285,562

(22) PCT Filed: Dec. 23, 2021

(86) PCT No.: PCT/JP2021/047866
§ 371 (c)(1),
(2) Date: Oct. 4, 2023

(87) PCT Pub. No.: WO2022/215302
PCT Pub. Date: Oct. 13, 2022

(65) Prior Publication Data
US 2024/0180218 A1 Jun. 6, 2024

(30) Foreign Application Priority Data

Apr. 7, 2021 (JP) .............................. JP2021-065487

(51) Int. Cl.
*A23L 27/50* (2016.01)
*A23L 11/00* (2025.01)
(52) U.S. Cl.
CPC .............. *A23L 27/50* (2016.08); *A23L 11/07* (2016.08)

(58) Field of Classification Search
CPC ........... A23L 27/50; A23L 11/05; A23L 11/07
USPC ......................................................... 426/634
See application file for complete search history.

(56) References Cited

U.S. PATENT DOCUMENTS

| | | | |
|---|---|---|---|
| 5,702,749 | A | 12/1997 | Sugiura et al. |
| 2003/0031776 | A1 | 2/2003 | Thresher |

FOREIGN PATENT DOCUMENTS

| | | |
|---|---|---|
| CA | 2 888 664 | 5/2014 |
| JP | 46-28839 | 8/1971 |
| JP | 55-85380 | 6/1980 |
| JP | 5-84048 | 4/1993 |
| JP | 7-184593 | 7/1995 |
| JP | 7-213249 | 8/1995 |
| JP | 2767679 | 4/1998 |
| JP | 2001-37440 | 2/2001 |
| JP | 3441219 | 6/2003 |
| JP | 2003-520039 | 7/2003 |
| JP | 2011-244711 | 12/2011 |

(Continued)

OTHER PUBLICATIONS

International Search Report issued Mar. 8, 2022 in corresponding International (PCT) Patent Application No. PCT/JP2021/047866, with English language translation.

(Continued)

*Primary Examiner* — Subbalakshmi Prakash
(74) *Attorney, Agent, or Firm* — Wenderoth, Lind & Ponack, L.L.P.

(57) ABSTRACT

The invention relates to a powdered soy sauce containing at least one of pea powder and soybean powder. The invention also relates to a method for producing a powdered soy sauce including adding at least one of pea powder and soybean powder to a liquid soy sauce 5 and then conducting dry-powdering process of the liquid soy sauce.

9 Claims, 7 Drawing Sheets

(56) References Cited

FOREIGN PATENT DOCUMENTS

| JP | 2013-141420 | 7/2013 |
| JP | 2015-123001 | 7/2015 |
| JP | 2019-80524 | 5/2019 |
| JP | 6831487 | 2/2021 |
| JP | 2021-112180 | 8/2021 |
| WO | 2015/041211 | 3/2015 |

OTHER PUBLICATIONS

Written Opinion issued Mar. 8, 2022 in corresponding International (PCT) Patent Application No. PCT/JP2021/047866, with English language translation.
Products posted on the online shopping site Amazon.co.jp, page of "Outdoor-friendly soy sauce powder 30g [seasoning/cooking/camping/BBQ] brand: Healthy Best", [online] Mar. 19, 2021.
Sablani, S.S. et al., "A new method of producing date powder granules: Physicochemical characteristics of powder", Journal of Food Engineering, vol. 87, pp. 416-421, 2008.
Cai, Y.Z. and H. Corke, "Production and Properties of Spray-dried *Amaranthus* Betacyanin Pigments", Journal of Food Science, vol. 65, pp. 1248-1252, 2000.
Ersus, S. and U. Yurdagel, "Microencapsulation of anthocyanin pigments of black carrot (*Daucuscarota* L.) by spray drier", Journal of Food Engineering, vol. 80, pp. 805-812, 2007.
Extended European Search Report issued Feb. 26, 2025 in corresponding European Patent Application No. 21936099.7.
Office Action issued Jan. 24, 2025 in corresponding Chinese Patent Application No. 202180096526.2, with English-language translation.
Gao, F. et al., "Food Engineering High Technology, Chapter 8 High Technology of Food Texture Adjustment, 2. Extruded Texturized Cottonseed Protein", China Light Industry Press, J. Zheng ed., Sep. 2020, pp. 363-366, with partial English-language translation.

POWDERED SOY SAUCE AND PRODUCTION METHOD THEREOF

TECHNICAL FIELD

The present invention relates to a powdered soy sauce, in particular a powdered soy sauce having excellent solidification resistance, and to a production method thereof.

BACKGROUND ART

Although soy sauces have been used mainly in liquid form, more than one type of powdered soy sauce has recently been developed and sold. Regarding the applications of powdered soy sauces, powdered soy sauces have been used for a base of instant ramen soup and the like but are currently applied more widely in the fields of powdered seasoning blends, frozen foods, processed meat and the like. Commercial powdered soy sauces are mainly produced by subjecting a liquid soy sauce to dry-powdering process such as spray drying.

Powdered soy sauces have a huge problem because the powder adheres and solidifies due to use at a relatively high humidity or long-term storage. This is believed to be because components which easily cause moisture absorption, such as salt, sugars and amino acids, are contained in high amounts in the components of a powdered soy sauce or because moisture generates due to the progress of the Maillard reaction of sugars and amino acids in a powdered soy sauce.

To solve the problem, for example, means for increasing the glass transition temperature (Tg) of the powder by adding a carbohydrate having a high molecular weight, such as maltodextrin, and decreasing the hygroscopicity and the like are adopted (see NPLs 1 to 3). Moreover, a method of powdering after adding a moisture-absorbing, solidification-preventing agent, such as potassium alginate having a reduced molecular weight, gelatin, dextrin and com starch, to a soy sauce is also known (for example, see PTLs 1 to 5).

Here, a method for preventing solidification due to moisture absorption by adding and mixing wheat or corn fiber to a seasoning food containing salt or a powdery spice composition having high water absorbability such as onion is known (see PTL 6).

CITATION LIST

Patent Literature

PTL 1: JP2011-244711A
PTL 2: JPS46-28839B
PTL 3: JP2767679B
PTL 4: JP3441219B
PTL 5: JP2001-037440A
PTL 6: JPH05-84048A

Non Patent Literature

NPL 1: Sablani, S. S., Shrestha, A. K, Bhandari, B. R. (2008). Journal of food Engineering, 87, 416-421.
NPL 2: Cai, Y. Z., Corke, H. (2000). Journal of Food Science, 65, 1248-1252.

NPL 3: Ersus, S., Yurdagel, U. (2007). Journal of Food Engineering, 80, 805-812.

SUMMARY OF INVENTION

Technical Problem

Maltodextrin described in NPLs 1 to 3, however, has a problem because the hygroscopicity and the stickiness increase when maltodextrin is exposed to an environment at a high relative humidity due to its amorphous property, and maltodextrin is not sufficient for improving the solidification resistance of a powdered soy sauce.

The powdered soy sauces described in PTLs 1 to 5, which were produced by adding potassium alginate having a reduced molecular weight, gelatin, dextrin, corn starch or the like to a soy sauce, could not sufficiently improve the solidification resistance.

On the other hand, the method described in PTL 6, which prevents solidification by adding fiber of grains to a powdery salt-containing composition having high hygroscopicity, does not disclose any powdered soy sauce and is a technique directed to prevention of solidification of a powdery spice composition.

Thus, an object of the invention is to provide a powdered soy sauce having sufficient solidification resistance and a production method thereof.

Solution to Problem

As a result of extensive investigation to solve the problem, the present inventors have found that a powdered soy sauce having sufficient solidification resistance is obtainable when at least one of pea powder and soybean powder is contained in the powdered soy sauce, and the inventors have completed the invention based on the findings.

That is, the invention is as follows.

[1] A powdered soy sauce containing at least one of pea powder and soybean powder.

[2] The powdered soy sauce described in [ 1] above which contains 8 mass % or more of the pea powder as a solid content based on the powdered soy sauce.

[3] The powdered soy sauce described in [1] or [2] above which contains 8 mass % or more of the soy bean powder as a solid content based on the powdered soy sauce.

[4] The powdered soy sauce described in any one of [1] to [3] above which is obtainable by dry-powdering a liquid soy sauce obtainable by adding at least one of the pea powder and the soybean powder to a liquid soy sauce.

[5] The powdered soy sauce described in any one of [1] to [4] above, wherein the average of the aspect ratios of particles of the powdered soy sauce is 0.85 or more.

[6] The powdered soy sauce described in any one of [1] to [5] above, wherein the pea powder or the soybean powder forms a particle together with a soy sauce component.

[7] The powdered soy sauce described in any one of [1] to [6] above which is obtainable by adding at least one of the pea powder and the soybean powder to a liquid soy sauce and then conducting dry-powdering process of the liquid soy sauce.

[8] A method for producing a powdered soy sauce including adding at least one of pea powder and soybean powder to a liquid soy sauce and then conducting dry-powdering process of the liquid soy sauce.

[9] The method for producing a powdered soy sauce described in [8] above. wherein the pea powder or the soybean powder contains 45 mass % or more of dietary fiber.

[10] The method for producing a powdered soy sauce described in [8] or [9] above, wherein the water absorption rate of the pea powder is 500% or less.

[11] The method for producing a powdered soy sauce described in [8] or [9] above, wherein the water absorption rate of the soybean powder is 600% or less.

Advantageous Effects of Invention

According to the invention, a powdered soy sauce having sufficient solidification resistance and a production method thereof can be provided.

DESCRIPTION OF EMBODIMENTS

Figure 1:
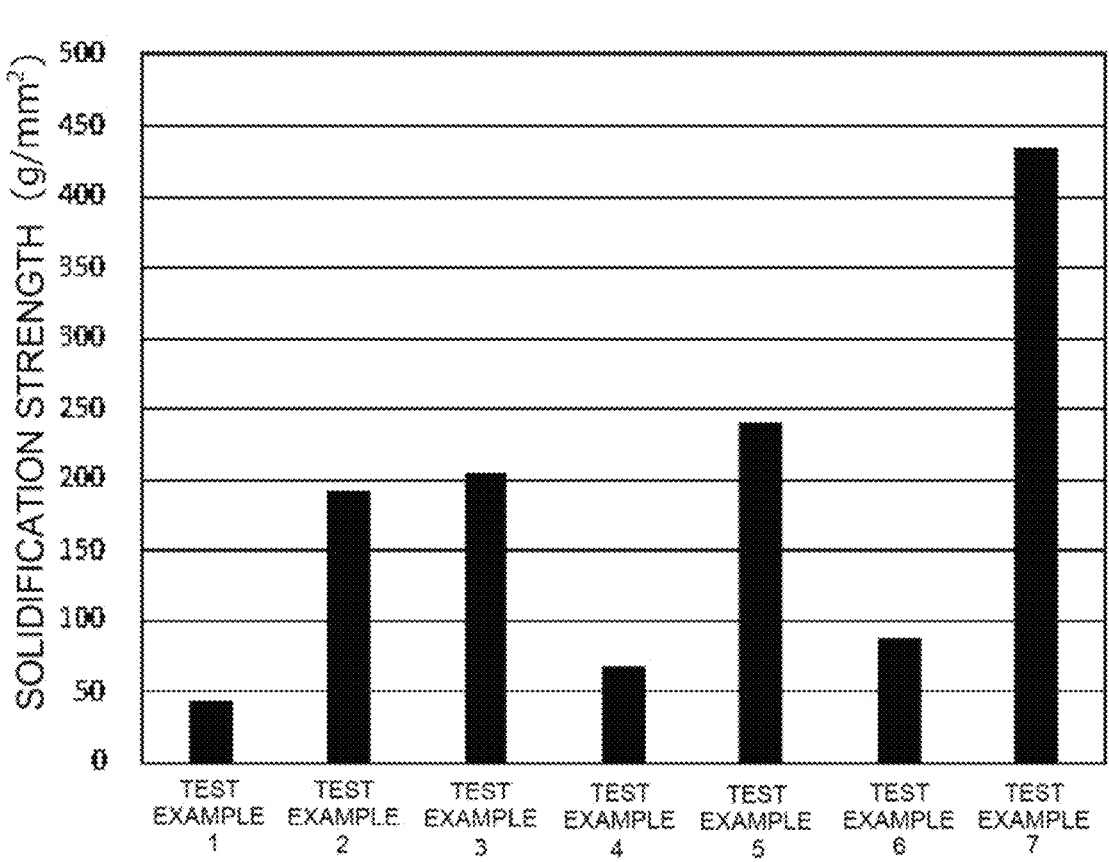
FIG. 1 is a graph showing the solidification strengths of the powdered soy sauces evaluated in Experimental Example 1.

The structures and preferable modes of the invention will be explained in further detail below.

In this specification, "A to B" indicating a range means "A or more and B or less". Moreover, in this specification. "weight" and "mass" and "weight %" and "mass %" are each regarded as synonyms.

<Powdered Soy Sauce>

The powdered soy sauce of an embodiment of the invention contains at least one of pea powder and soybean powder. This is based on the finding that significantly excellent solidification resistance is obtained when the powdered soy sauce of the embodiment contains pea powder or soybean powder.

Although the reason why the solidification resistance becomes excellent when the powdered soy sauce of the embodiment contains pea powder or soybean powder is not clear, this is speculated to be because the pea powder or the soybean powder is strong against hydrolysis by heating or by an enzyme and strongly exhibits an effect as an excipient or because the dietary fiber contained in the pea powder or the soybean powder can adsorb a large amount of moisture, which promotes solidification.

In this regard, however, the invention is not limited to those having the mechanism of action.

(Pea Powder)

The pea powder is obtainable, for example, by drying and crushing peas. In particular, because the dietary fiber content described below is high, pea powder obtainable by drying and crushing seed coats of peas or pea cotyledons is preferable.

The methods for drying and crushing peas are not particularly restricted, and any conventionally known methods can be used. For example, peas can be dried with a general commercial grain dryer. Moreover, for crushing peas, for example, a method of powdering with a commercial industrial large crusher is used. As the industrial large crusher, for example, an air tag mill (manufactured by MicroPowtec Corporation), a nano-jetmizer (manufactured by Aishin Nano Technologies Co., Ltd) or the like can be used.

The pea powder preferably contains dietary fiber derived from peas. There are roughly two types of dietary fiber derived from peas, namely dietary fiber derived from seed coats of peas and dietary fiber derived from pea cotyledons. The dietary fiber derived from seed coats of peas contains water-insoluble polysaccharides mainly including cellulose, and the dietary fiber derived from pea cotyledons contains polysaccharides such as hemicellulose and pectin in addition to cellulose.

The pea powder preferably contains 45 mass % or more of dietary fiber and more preferably contains 55 mass % or more of dietary fiber. When the dietary fiber content is in the range, a better solidification resistance effect is obtained. The upper limit of the dietary fiber content is not particularly restricted but is, for example, 90 mass % or less.

Here, pea powder having a high dietary fiber content as described above is also called "pea fiber". The pea fiber is distinguished from the dietary fiber itself contained in the pea powder.

The pea powder may contain water, an ash content, protein, lipid, carbohydrate, salt and another component in addition to the dietary fiber.

The water content of the pea powder is, for example, 0 to 15 mass %.

The ash content of the pea powder is, for example, 0 to 5 mass %. The ash content means the amount of residue excluding organic materials and water remaining after ashing a food at a high temperature, and examples thereof include minerals such as potassium, sodium and iron and the like.

The protein content of the pea powder is, for example, 0 to 25 mass %.

The lipid content of the pea powder is, for example, 0 to 5 mass %.

The carbohydrate content (excluding dietary fiber) of the pea powder is, for example, 5 to 70 mass %. Examples of the carbohydrate (excluding dietary fiber) include starch, sucrose and the like.

The salt content of the pea powder is, for example, 0 to 1 mass %.

The range of the water absorption rate of the pea powder is not particularly restricted but is preferably 500% or less, more preferably 400% or less, further preferably 370% or less. When the water absorption rate of the pea powder is in the range, a better solidification resistance effect is obtained.

In this regard, the water absorption rate of the pea powder is obtained by the following measurement method.

First, water-soaked pea powders obtainable by adding 50 g of water to 5 g of pea powders is filtered through a filter paper for draining, and the weight of the pea powder after draining (the weight of the pea powder after water absorption) is measured (weight 1).

Subsequently, the pea powder is dried by storing the pea powder after draining for 48 hours in an atmosphere adjusted at a temperature of 15 to 20° C. and a relative humidity of 40 to 60%, and the weight of the pea powder after drying is measured (weight 2).

The weight of the evaporated water (weight 3) is determined by subtracting the weight 2 from the weight 1 (weight 1-weight 2). Then, the water absorption rate is determined by the following equation.

$$\text{Water Absorption Rate (\%)} = \{(\text{Weight of Pea Powder after Water Absorption (g)} - \text{Weight of Pea Powder after Drying (g)})/\text{Weight of Pea Powder after Drying (g)}\} \times 100$$

$$= \{(\text{Weight 1} - \text{Weight 2})/\text{Weight 2}\} \times 100$$

$$= (\text{Weight 3}/\text{Weight 2}) \times 100$$

As the pea powder, a commercial product may be used, and examples thereof include Pea Fiber manufactured by AGFeeding Sp.zo.o. and Swelite(R)F manufactured by COSUCRA.

The pea powder is preferably contained at 6 mass % or more as a solid content based on the powdered soy sauce of the embodiment, more preferably contained at 8 mass % or more, further preferably contained at 10 mass % or more, further preferably contained at 12 mass % or more, further preferably contained at 16 mass % or more, further preferably contained at 20 mass % or more and particularly preferably contained at 22 mass % or more. When the powdered soy sauce of the embodiment contains 6 mass % or more of the pea powder as a solid content, a better solidification resistance effect is obtained.

Moreover, the pea powder is preferably contained at 70 mass % or less as a solid content based on the powdered soy sauce of the embodiment, more preferably contained at 66 mass % or less, further preferably contained at 40 mass % or less, further preferably contained at 30 mass % or less and particularly preferably contained at 25 mass % or less. When the powdered soy sauce of the embodiment contains 70 mass % or less of the pea powder as a solid content, an excellent solidification resistance effect is obtained without impairing the taste of the soy sauce.

Moreover, the pea powder is preferably contained at 6 to 70 mass % as a solid content based on the powdered soy sauce of the embodiment, more preferably contained at 8 to 66 mass %, further preferably contained at 10 to 40 mass % and particularly preferably contained at 20 to 30 mass %.

The pea powder is not particularly restricted, but for example, pea powder in which 80 mass % of the particles distribute in 20 to 59 μm and in which the median size is 30 to 40 μm can be used.

Moreover, in the powdered soy sauce of the embodiment, as described below, it is speculated that the powdered soy sauce is prevented from absorbing moisture and that the solidification resistance of the powdered soy sauce improves significantly because the pea powder contained in the powdered soy sauce forms a particle as the powdered soy sauce together with the soy sauce components. Accordingly, the aspect ratios of the particles of the powdered soy sauce containing the pea powder of the embodiment are preferably high. and the average of the aspect ratios is preferably 0.85 or more, more preferably 0.90 or more, further preferably 0.95 or more. Moreover, the average is, for example, 1.0 or less.

The aspect ratio of a particle of the powdered soy sauce containing the pea powder means the minor axis size (width)/major axis size (length) of the particle and can be measured by the method described in the Examples below.
(Soybean Powder)

The soybean powder is obtainable, for example, by drying and crushing soybeans. The drying and crushing methods are not particularly restricted, and any conventionally known methods can be used. For example, soybeans can be dried with a general commercial grain dryer. Moreover, for crushing soybeans, for example, a method of powdering with a commercial industrial large crusher is used. For example, as the industrial large crusher, an air tag mill (manufactured by MicroPowtec Corporation), a nano-jet-mizer (manufactured by Aishin Nano Technologies Co., Ltd) or the like can be used.

The soybean powder preferably contains dietary fiber derived from soybean powder. Examples of the dietary fiber derived from soybeans include hemicellulose in addition to cellulose.

The soybean powder preferably contains 45 mass % or more of dietary fiber, more preferably contains 50 mass % or more of dietary fiber and further preferably contains 75 mass % or more of dietary fiber. When the dietary fiber content is in the range, a better solidification resistance effect is obtained.

Here, soybean powder having a high dietary fiber content as described above is also called "soybean fiber". The soybean fiber is distinguished from the dietary fiber itself contained in the soybean powder.

The soybean powder may contain water, an ash content, protein, lipid, carbohydrate, salt and another component in addition to the dietary fiber.

The water content of the soybean powder is, for example, 0 to 15 mass %.

The ash content of the soybean powder is, for example, 0 to 6 mass %. Examples of the ash content include potassium, phosphorus, calcium and the like.

The protein content of the soybean powder is, for example, 0 to 40 mass %.

The lipid content of the soybean powder is, for example, 0 to 30 mass %.

The carbohydrate content (excluding dietary fiber) of the soybean powder is, for example, 0 to 60 mass %. Examples of the carbohydrate (excluding dietary fiber) include starch, sucrose and the like.

The salt content of the soybean powder is, for example, 0 to 1 mass %.

The range of the water absorption rate of the soybean powder is not particularly restricted but is preferably 600% or less, more preferably 550% or less, further preferably 500% or less. When the water absorption rate of the soybean powder is in the range, a better solidification resistance effect is obtained.

In this regard, the water absorption rate of the soybean powder can be measured by the same method as that of the water absorption rate of the pea powder.

As the soybean powder, a commercial product may be used, and examples thereof include soy fiber manufactured by Nippon Garlic Corporation and soy fiber of Nutra food INGREDIENTS.

The soybean powder is preferably contained at 6 mass % or more as a solid content based on the powdered soy sauce of the embodiment, more preferably contained at 8 mass % or more, further preferably contained at 10 mass % or more, further preferably contained at 16 mass % or more, further preferably contained at 20 mass % or more and particularly preferably contained at 22 mass % or more. When the powdered soy sauce of the embodiment contains 6 mass % or more of the soybean powder as a solid content, a better solidification resistance effect is obtained.

Moreover, the soybean powder is preferably contained at 70 mass % or less as a solid content based on the powdered soy sauce of the embodiment, more preferably contained at 66 mass % or less, further preferably at 40 weight % or less and particularly preferably contained at 30 mass % or less. When the powdered soy sauce of the embodiment contains 70 mass % or less of the soybean powder as a solid content, an excellent solidification resistance effect is obtained without impairing the taste of the soy sauce.

Moreover, the soybean powder is preferably contained at 6 to 70 mass % as a solid content based on the powdered soy sauce of the embodiment, more preferably contained at 8 to 66 mass % and further preferably contained at 22 to 30 mass %.

The soybean powder is not particularly restricted, but for example, soybean powder in which 80 mass % of the particles distribute in 24 to 65 μm and in which the median size is 35 to 45 μm can be used.

In the powdered soy sauce of the embodiment, as described below, it is speculated that the powdered soy sauce is prevented from absorbing moisture and that the solidification resistance of the powdered soy sauce improves significantly because the soybean powder contained in the powdered soy sauce forms a particle as the powdered soy sauce together with the soy sauce components. Accordingly, the aspect ratios of the particles of the powdered soy sauce containing the soybean powder of the embodiment are preferably high, and the average of the aspect ratios is preferably 0.85 or more, more preferably 0.90 or more, further preferably 0.92 or more. Moreover, the average is, for example, 1.0 or less.

The aspect ratio of a particle of the powdered soy sauce containing the soybean powder means the minor axis size (width)/major axis size (length) of the particle and can be measured by the method described in the Examples below.

To improve the solidification resistance, one of the pea powder and the soybean powder can be contained or a mixture thereof can be used for the powdered soy sauce of the embodiment; however, either one alone is preferably contained, and the pea powder alone is further preferably contained.

Furthermore, the powdered soy sauce of the embodiment more preferably contains no excipient other than the pea powder and the soybean powder to improve the solidification resistance.

<Production Method of Powdered Soy Sauce>

The method for producing a powdered soy sauce of an embodiment of the invention includes a step of adding at least one of pea powder and soybean powder to a liquid soy sauce and then conducting dry-powdering process.

The method for producing a powdered soy sauce of the embodiment is based on the finding that, when dry-powdering process is conducted after adding at least one of pea powder and soybean powder to a liquid soy sauce, the solidification resistance of the powdered soy sauce improves significantly compared to the case in which the pea powder or the soybean powder is added after dry-powdering process.

Although the reason for the above is not clear, this is believed to be because the pea powder or the soybean powder contained in the powdered soy sauce forms a particle as the powdered soy sauce together with the soy sauce components. That is, this is speculated to be because the powdered soy sauce is prevented from absorbing moisture because the dietary fiber, which does not easily absorb moisture, contained in the pea powder or the soybean powder forms a particle as the powdered soy sauce together with the soy sauce components.

In this regard, the invention is not limited to those having the mechanism of action.

The liquid soy sauce is not particularly restricted, and examples thereof include a koikuchi (dark-colored) soy sauce, a soy sauce with a low sodium chloride content, an usukuchi (light-colored) soy sauce, a tamari (rich) soy sauce, a rebrewed soy sauce, a shiro (very light-colored) soy sauce and the like. Moreover, examples thereof include a soy sauce in the manufacturing process, an unheated soy sauce, a kiage (just pressed) soy sauce and the like.

As it is well known, a liquid soy sauce is produced by mixing steamed soybeans and roasted crushed wheat as protein-containing raw materials, inoculating and culturing a seed koji starter for a soy sauce therein to prepare a soy sauce koji, adding an adequate amount of a saline solution thereto to prepare a moromi (moromi-mash), fermenting for a certain period, aging to prepare an aged moromi (moromi-mash), finally pressing, filtering, pasteurizing and clearing.

Examples of the method for producing a soy sauce with a low sodium chloride content include a method using a saline solution having a concentration as low as possible to avoid spoilage, a method using a saline solution having a lower concentration by preventing spoilage using an alcohol in combination for brewing water, a method for producing a soy sauce with a low sodium chloride content by desalting a soy sauce which is obtained by a normal method and which has a sodium chloride concentration of 15 to 18 mass % by electrodialysis, membrane process or the like, a method of replacing a part of the sodium chloride in the soy sauce with potassium chloride (KCl) (JPS38-6582B, JPS56-68372A and JP2006-87328A) and a production method in which the amounts of the aroma component and the taste component in the soy sauce are adjusted in specific ranges (WO2011/034049).

The dry-powdering process can be conducted, for example, by a method generally used in the field, such as the spray drying method, the drum drying method and the freeze-drying method. Of these, the spray drying method is preferable.

Examples of the device used for spray drying include a pressure nozzle spray dryer, a two-fluid nozzle spray dryer, a rotary disc (disc atomizer) spray dryer, a spray drying/granulation dryer and the like. The spray drying conditions are not different from the spray drying conditions for a regular liquid soy sauce and are appropriately determined. Specifically, for example, with an actual nozzle device, powdering is preferably conducted under the conditions of an air intake (inlet) temperature of 150 to 230° C., an outlet temperature of 85 to 130° C. and a feed amount of 500 to 2000 liter/hour.

The method for producing a powdered soy sauce of the embodiment may be conducted according to the steps (for example, a step of preparing a soy sauce koji (koji-making), a step of preparing a soy sauce moromi (moromi-mash) (mixing of the soy sauce koji and a saline solution), a fermentation/aging step of the soy sauce moromi (moromi-mash), a pressing step and the like) and the conditions of a general method for producing a soy sauce except for conducting the step of dry-powdering process.

The solidification resistance of the powdered soy sauce of the embodiment can be evaluated by the solidification strength. The solidification strength here refers to the strength of the powder as an indicator for the difficulty of solidification of the powdered soy sauce and can be indicated by the breaking load (breaking force) measured using a rheometer (creepmeter) under specific conditions after certain moisture absorbing process. A lower value of solidification strength means that the powder does not easily solidify during storage, which means that the solidification resistance is excellent.

Specifically, the breaking force (the maximum load) of the powdered soy sauce of the embodiment measured by a rheometer using a cylindrical plunger having a diameter of 1 mm under the conditions of a measurement speed of 1 mm/second and a distortion factor of 50% after moisture absorption process (storage for three hours in an atmosphere adjusted at a temperature of 30° C. and a relative humidity of 80%) is preferably 200 g/mm² or less, more preferably 120 g/mm² or less, further preferably 50 g/mm² or less.

EXAMPLES

The invention will be explained in further detail below by Examples. Here, the invention is not limited to these Examples.

Experimental Example 1

In this Experimental Example, powdered soy sauces were prepared using various excipients, and the solidification resistance was evaluated. The kinds of excipients used in this Experimental Example are as shown in Table 1.

TABLE 1

| Excipient | Product Name | Manufacturer |
| --- | --- | --- |
| Pea Fiber | Pea Fiber | AG Feeding Sp. z o. o. |
| Wheat Fiber | VITACEL WF600 | Rettenmaier Japan Co., Ltd. |
| Corn Fiber | Resistant Starch | LOHAStyle Bubblestar |
| Soybean Fiber | Soy Fiber | Nippon Garlic Corporation |
| Powdered Cellulose | KC Flock W-400 | Nippon Paper Industries Co., Ltd. |

TABLE 1-continued

| Excipient | Product Name | Manufacturer |
| --- | --- | --- |
| Processed Starch | Sutabirozu K | Matsutani Chemical Industry Co., Ltd. |
| Dextrin | Sandec #70 | Sanwa Starch Co., Ltd. |

Here, as the pea fiber (pea powder), pea fiber which had a dietary fiber amount of 65 mass % and a water absorption rate of 347.5% and in which 80 mass % of the particles distributed in 20 to 59 μm and the median size was 36 μm was used.

Moreover, as the soybean fiber (soybean powder), soybean fiber which had a dietary fiber amount of 79 mass % and a water absorption rate of 539% and in which 80 mass % of the particles distributed in 24 to 65 μm and the median size was 40 μm was used.

The water absorption rates above mean those determined by the measurement method described above.

(1) Preparation of Powdered Soy Sauces (Test Example 1 to Test Example 7)

Certain amounts of the excipients shown in Table 2 below were added to a liquid soy sauce (a koikuchi (dark-colored) soy sauce, sodium chloride concentration 16% (w/v)) and dissolved/suspended while heating to 85° C. and stirring.

Next, the solutions were spray-dried with a Mobile Minor spray dryer (TM-2000 Model-A; manufactured by NIRO JAPAN) under the conditions of an inlet temperature of 150 to 160° C. and an outlet temperature of 90 to 95° C., and powdered soy sauces were thus obtained.

TABLE 2

|  |  | Test Example 1 | Test Example 2 | Test Example 3 | Test Example 4 | Test Example 5 | Test Example 6 | Test Example 7 |
| --- | --- | --- | --- | --- | --- | --- | --- | --- |
| Liquid Soy Sauce (ml) |  | 1000 | 1000 | 1000 | 1000 | 1000 | 1000 | 1000 |
| Excipient | Pea Fiber (g) | 100 | 0 | 0 | 0 | 0 | 0 | 0 |
|  | Wheat Fiber (g) | 0 | 100 | 0 | 0 | 0 | 0 | 0 |
|  | Corn Fiber (g) | 0 | 0 | 100 | 0 | 0 | 0 | 0 |
|  | Soybean Fiber (g) | 0 | 0 | 0 | 100 | 0 | 0 | 0 |
|  | Powdered Cellulose (g) | 0 | 0 | 0 | 0 | 100 | 0 | 0 |
|  | Processed Starch (g) | 0 | 0 | 0 | 0 | 0 | 100 | 0 |
|  | Dextrin (g) | 0 | 0 | 0 | 0 | 0 | 0 | 100 |
| Water (ml) |  | 200 | 200 | 200 | 200 | 200 | 200 | 200 |
| Excipient Content (weight %) of Powdered Soy Sauce |  | 21.8 | 21.8 | 21.8 | 21.8 | 21.8 | 21.8 | 21.8 |

Here, the amounts (g) of the excipients added shown in Table 2 are the weights of the dry solid contents. Table 3 below shows the solid contents and the water contents of 2 g of the excipients which were dried under reduced pressure at 60° C. for three hours.

TABLE 3

| Excipient | Solid Content | Water Content | Total |
| --- | --- | --- | --- |
| Pea Fiber (g) | 94.4 | 5.6 | 100 |
| Wheat Fiber (g) | 94.3 | 5.7 | 100 |
| Corn Fiber (g) | 89.4 | 10.6 | 100 |
| Soybean Fiber (g) | 90.0 | 10.0 | 100 |
| Powdered Cellulose (g) | 96.6 | 3.4 | 100 |
| Processed Starch (g) | 87.0 | 13.0 | 100 |
| Dextrin (g) | 95.0 | 5.0 | 100 |

(2) Evaluation of Solidification Resistance

[Solidification Strength]

As an evaluation method of solidification resistance, the solidification strengths (breaking forces) of the powdered soy sauces after a moisture absorption solidification test were measured. Specifically, first, the powdered soy sauces (Test Example 1 to Test Example 7) obtained in (1) above were applied to Petri dishes (a diameter of 35 mm, a depth of 10 mm), and the surfaces were scraped off with a spatula into flat surfaces. Test samples for evaluation were thus produced. A moisture absorption solidification test was conducted by storing the samples for three hours in an atmosphere adjusted at a temperature of 30° C.' and a relative humidity of 80%. The breaking forces (the maximum breaking loads: g/mm²) of the test samples after the moisture absorption solidification test were measured with a rheometer (RHEONER II CREEP METER RE2-33005; manufactured by YAMADEN co., ltd.) under the conditions of a load cell for 2 kgf, a cylindrical plunger with a contact face diameter of 1 mm, a measurement speed of 1 mm/sec and a measurement distortion factor of 50%, and the averages of 15 specimens (five points/one Petri dish×3 dishes) were determined. The results are shown in FIG. 1.

Moreover, the solidification strengths were evaluated based on the following indicators. The results are shown in Table 4.

A: 50 g/mm² or less
B: more than 50 g/mm² and 120 g/mm² or less
C: more than 120 g/mm² and 200 g/mm² or less
D: more than 200 g/mm²

[Observation of Surface States and Internal States]

As another evaluation method of solidification resistance, the surface states and the internal states of the test samples were visually observed by persons in charge who had engaged in production/development of powdered soy sauces and who had professional knowledge. Before the evaluation, the persons agreed about the evaluation of each item to standardize the evaluation.

The evaluation was made based on the following indicators. Here, C or better was considered as passing.

The results are shown in Table 4.

<Surface State>

A: Smooth (almost equivalent to that before the moisture absorption solidification test)
B: Although moisture absorption is slightly observed, the sample becomes powdery when touched.
C: The sample has absorbed moisture and is moist.
D: The sample has absorbed moisture and has become a paste.

<Internal State>

A: Smooth (almost equivalent to that before the moisture absorption solidification test)
B: The sample is not smooth and is slightly moist, and the fluidity is slightly poor.
C: The sample is wet, and the fluidity is poor although the sample seems to be powdery.
D: The sample has absorbed moisture and has become a paste.

TABLE 4

| | | Solidification Resistance | | | |
| | | Solidification Strength | | Surface | Internal |
| | Excipient | (g/mm²) | (Evaluation) | State | State |
|---|---|---|---|---|---|
| Test Example 1 | Pea Fiber | 44.8 | A | A | A |
| Test Example 2 | Wheat Fiber | 193.8 | C | C | C |

TABLE 4-continued

| | | Solidification Resistance | | | |
| | | Solidification Strength | | Surface | Internal |
| | Excipient | (g/mm²) | (Evaluation) | State | State |
|---|---|---|---|---|---|
| Test Example 3 | Corn Fiber | 205.2 | D | D | B |
| Test Example 4 | Soybean Fiber | 66.9 | B | B | B |
| Test Example 5 | Powdered Cellulose | 239.9 | D | C | C |
| Test Example 6 | Processed Starch | 87.0 | B | D | B |
| Test Example 7 | Dextrin | 434.3 | D | D | B |

From the above results, it was found that better solidification resistance is obtained when pea powder or soybean powder, of the excipients, is added in particular.

Experimental Example 2

In this Experimental Example, the optimum pea powder content for obtaining solidification resistance was examined regarding the pea powder, which showed the most excellent solidification resistance among the excipients used in Experimental Example 1 above.

In Experimental Example 2-1, the whole or a part of dextrin used as the excipient in Test Example 7 was replaced with the pea fiber, and the solidification resistance was examined.

In Experimental Example 2-2, the pea fiber alone was used as the excipient, and the difference in the solidification resistance due to the pea fiber content was examined.

Experimental Example 2-1

(1) Preparation of Powdered Soy Sauces (Test Example 8 to Test Example 11, Test Example 1 and Test Example 7)

Certain amounts of the excipients (the pea fiber and dextrin either as a mixture or separately) shown in Table 5 below were added to a liquid soy sauce (a koikuchi (dark-colored) soy sauce, sodium chloride concentration 16% (w/v)) and dissolved/suspended while heating to 85° C. and stirring.

Next, the solutions were spray-dried with a Mobile Minor spray dryer (TM-2000 Model-A; manufactured by NIRO JAPAN) under the conditions of an inlet temperature of 150 to 160° C. and an outlet temperature of 90 to 95° C., and powdered soy sauces were thus obtained.

Here, the amounts (g) of the excipients added shown in Table 5 are the weights of the dry solid contents. Moreover, the same samples as in Experimental Example 1 above were used for Test Example 1 and Test Example 7.

TABLE 5

| | | Test Example 7 | Test Example 8 | Test Example 9 | Test Example 10 | Test Example 1 | Test Example 11 |
|---|---|---|---|---|---|---|---|
| Liquid Soy Sauce (ml) | | 1000 | 1000 | 1000 | 1000 | 1000 | 1000 |
| Excipient | Pea Fiber (g) | 0 | 25 | 50 | 75 | 100 | 200 |
| | Dextrin (g) | 100 | 75 | 50 | 25 | 0 | 0 |
| Water (ml) | | 200 | 200 | 200 | 200 | 200 | 200 |
| Pea Fiber Content (weight %) of Powdered Soy Sauce | | 0 | 5.4 | 10.9 | 16.3 | 21.8 | 43.6 |
| Excipient Content (weight %) of Powdered Soy Sauce | | 21.8 | 21.8 | 21.8 | 21.8 | 21.8 | 37.5 |

(2) Evaluation of Solidification Resistance

Figure 2:
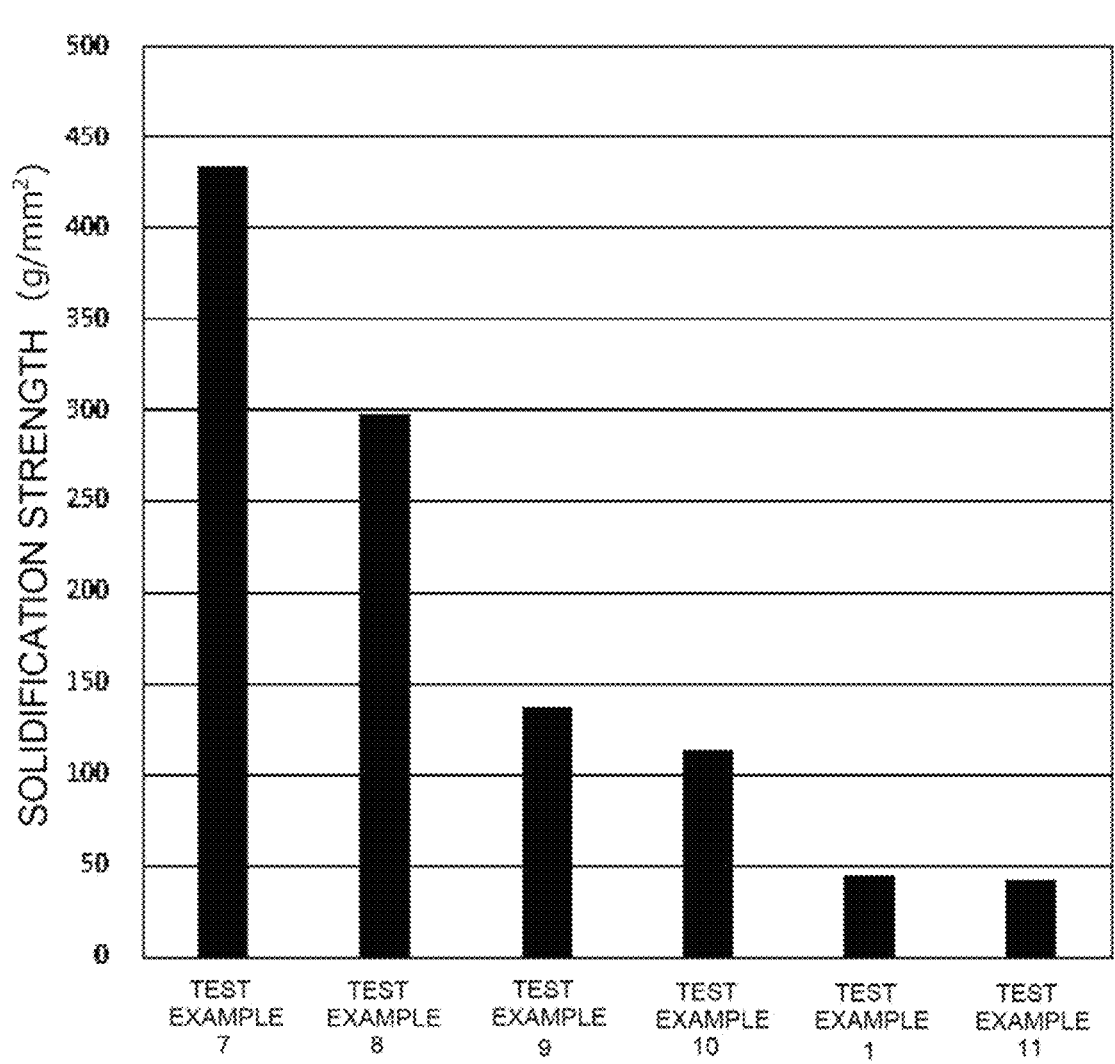
FIG. 2 is a graph showing the solidification strengths of the powdered soy sauces evaluated in Experimental Example 2-1.

The results of evaluation of the solidification resistance conducted in the same manner as in Experimental Example 1 are shown in Table 6 below. The results of the solidification strengths are also shown in FIG. 2.

TABLE 6

| | Proportion (weight %) in Excipients | | Pea Fiber Content (weight %) of Powdered Soy Sauce | Solidification Resistance | | | |
|---|---|---|---|---|---|---|---|
| | | | | Solidification Strength | | Surface State | Internal State |
| | Dextrin | Pea Fiber | | $(g/mm^2)$ | (Evaluation) | | |
| Test Example 7 | 100 | 0 | 0 | 434.3 | D | D | B |
| Test Example 8 | 75 | 25 | 5.4 | 297.4 | D | D | B |
| Test Example 9 | 50 | 50 | 10.9 | 137.1 | C | C | B |
| Test Example 10 | 25 | 75 | 16.3 | 113.1 | B | B | B |
| Test Example 1 | 0 | 100 | 21.8 | 44.8 | A | A | A |
| Test Example 11 | 0 | 200 | 37.5 | 42.5 | A | A | A |

From the above results, the following findings were made: excellent solidification resistance is obtained when the pea powder content of the powdered soy sauce is 6 mass % or more as a solid content; better solidification resistance is obtained at 16 mass % or more; and further better solidification resistance is obtained at 20 mass % or more.

Experimental Example 2-2

(1) Preparation of Powdered Soy Sauces (Test Example 12 to Test Example 18 and Test Example 1)

The pea fiber was added at the proportions shown in Table 7 below to a liquid soy sauce (a koikuchi (dark-colored) soy sauce, sodium chloride concentration 16% (w/v)) and dissolved/suspended while heating to 85° C. and stirring. Next, the solutions were spray-dried with a Mobile Minor spray dryer (TM-2000 Model-A; manufactured by NIRO JAPAN) under the conditions of an inlet temperature of 150 to 160° C. and an outlet temperature of 90 to 95° C., and powdered soy sauces were thus obtained (Test Example 12 to Test Example 18 and Test Example 1).

Here, the amounts (g) of the pea fiber added shown in Table 7 are the weights of the dry solid contents. Moreover, the same sample as in Experimental Example 1 above was used for Test Example 1.

TABLE 7

| | Test Example 12 | Test Example 13 | Test Example 1 | Test Example 14 | Test Example 15 | Test Example 16 | Test Example 17 | Test Example 18 |
|---|---|---|---|---|---|---|---|---|
| Liquid Soy Sauce (ml) | 1000 | 1000 | 1000 | 1000 | 1000 | 1000 | 1000 | 1000 |
| Pea Fiber (g) | 1000 | 700 | 100 | 50 | 40 | 30 | 10 | 0 |
| Water (ml) | 200 | 200 | 200 | 200 | 200 | 200 | 200 | 200 |
| Pea Fiber Content (weight %) of Powdered Soy Sauce | 75.9 | 66.0 | 21.8 | 12.2 | 10.0 | 7.7 | 2.7 | 0 |

(2) Evaluation of Solidification Resistance

Figure 3:
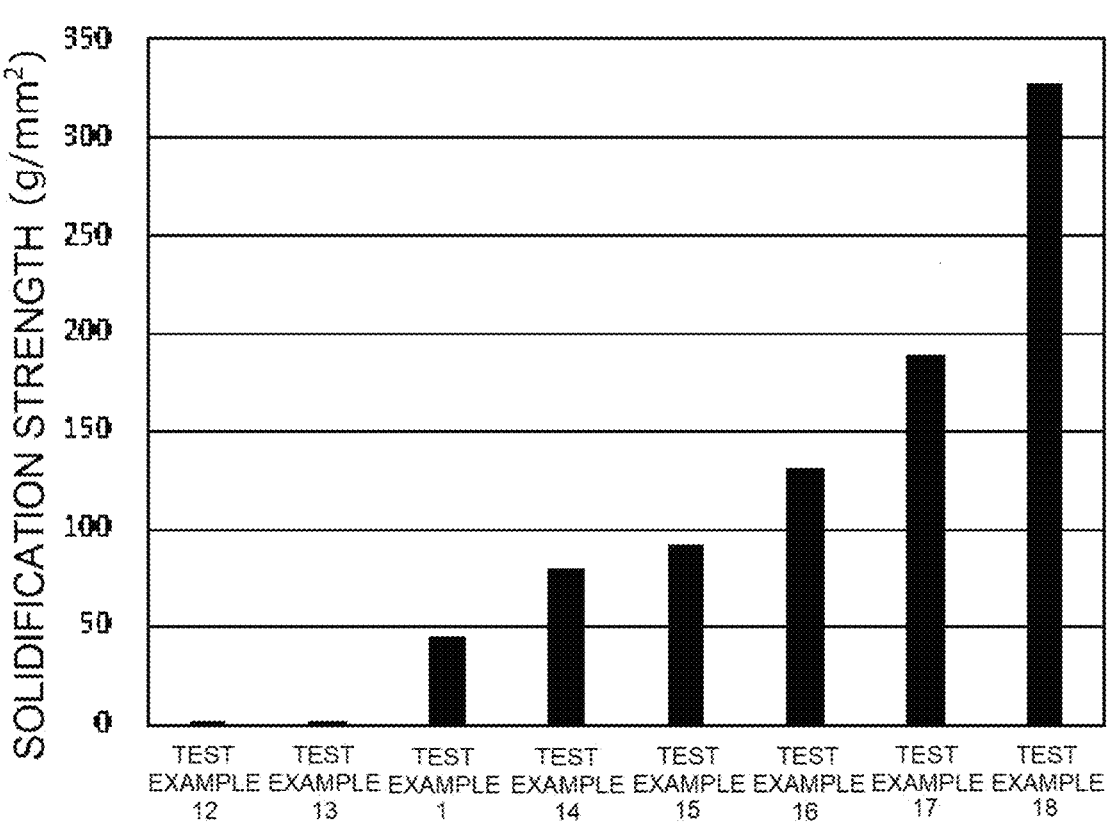
FIG. 3 is a graph showing the solidification strengths of the powdered soy sauces evaluated in Experimental Example 2-2.

The results of evaluation of the solidification resistance conducted in the same manner as in Experimental Example 1 are shown in Table 8 below. The results of the solidification strengths are also shown in FIG. 3.

(3) Evaluation of Taste

Persons in charge who had engaged in production/development of powdered soy sauces and who had professional knowledge ate the test samples and evaluated the presence or the absence of the soy sauce taste based on the following indicators. Here, C or better was considered as passing.

B: The sample has the soy sauce taste.

C: The soy sauce taste is felt although it is weak.

D: The sample does not have the soy sauce taste.

TABLE 8

| | Pea Fiber Content | Solidification Resistance | | | | |
| | (weight %) of | Solidification Strength | | Surface | Internal | |
| | Powdered Soy Sauce | (g/mm²) | (Evaluation) | State | State | Taste |
| --- | --- | --- | --- | --- | --- | --- |
| Test Example 12 | 75.9 | 2 | A | A | A | D |
| Test Example 13 | 66.0 | 2 | A | A | A | C |
| Test Example 1 | 21.8 | 44.8 | A | A | A | B |
| Test Example 14 | 12.2 | 79.7 | B | B | A | B |
| Test Example 15 | 10.0 | 91.5 | B | B | B | B |
| Test Example 16 | 7.7 | 130.5 | C | C | B | B |
| Test Example 17 | 2.7 | 189.8 | C | D | B | B |
| Test Example 18 | 0 | 327.7 | D | D | B | B |

From the above results, it was found that, when pea powder alone is used as an excipient, excellent solidification resistance is obtained when the pea powder content of the powdered soy sauce is 6 mass % or more as a solid content. Moreover, when the content exceeded 70 mass %, the taste of the soy sauce became weak.

Experimental Example 3

In this Experimental Example, the optimum content for obtaining solidification resistance was examined for the soybean powder, which showed excellent solidification resistance among the excipients used in Experimental Example 1 above.

(1) Preparation of Powdered Soy Sauces (Test Example 19 to Test Example 22, Test Example 4 and Test Example 18)

The soybean fiber was added at the proportions shown in Table 9 below to a liquid soy sauce (a koikuchi (dark-colored) soy sauce, sodium chloride concentration 16% (w/v)) and dissolved/suspended while heating to 85° C. and stirring. Next, the solutions were spray-dried with a Mobile Minor spray dryer (TM-2000 Model-A; manufactured by NIRO JAPAN) under the conditions of an inlet temperature of 150 to 160° C. and an outlet temperature of 90 to 95° C., and powdered soy sauces were thus obtained (Test Example 19 to Test Example 22, Test Example 4 and Test Example 18).

Here, the amounts (g) of the soybean fiber added shown in Table 9 are the weights of the dry solid contents. Moreover, the sample in Experimental Example 1 above was used for Test Example 4, and the sample in Experimental Example 2-2 above was used for Test Example 18.

TABLE 9

| | Test Example 19 | Test Example 20 | Test Example 4 | Test Example 21 | Test Example 22 | Test Example 18 |
| --- | --- | --- | --- | --- | --- | --- |
| Liquid Soy Sauce (ml) | 1000 | 1000 | 1000 | 1000 | 1000 | 1000 |
| Soybean Fiber (g) | 1000 | 700 | 100 | 40 | 30 | 0 |
| Water (ml) | 200 | 200 | 200 | 200 | 200 | 200 |
| Soybean Fiber Content (weight %) of Powdered Soy Sauce | 75.9 | 66.0 | 21.8 | 10.0 | 7.7 | 0 |

(2) Evaluation of Solidification Resistance

Figure 4:
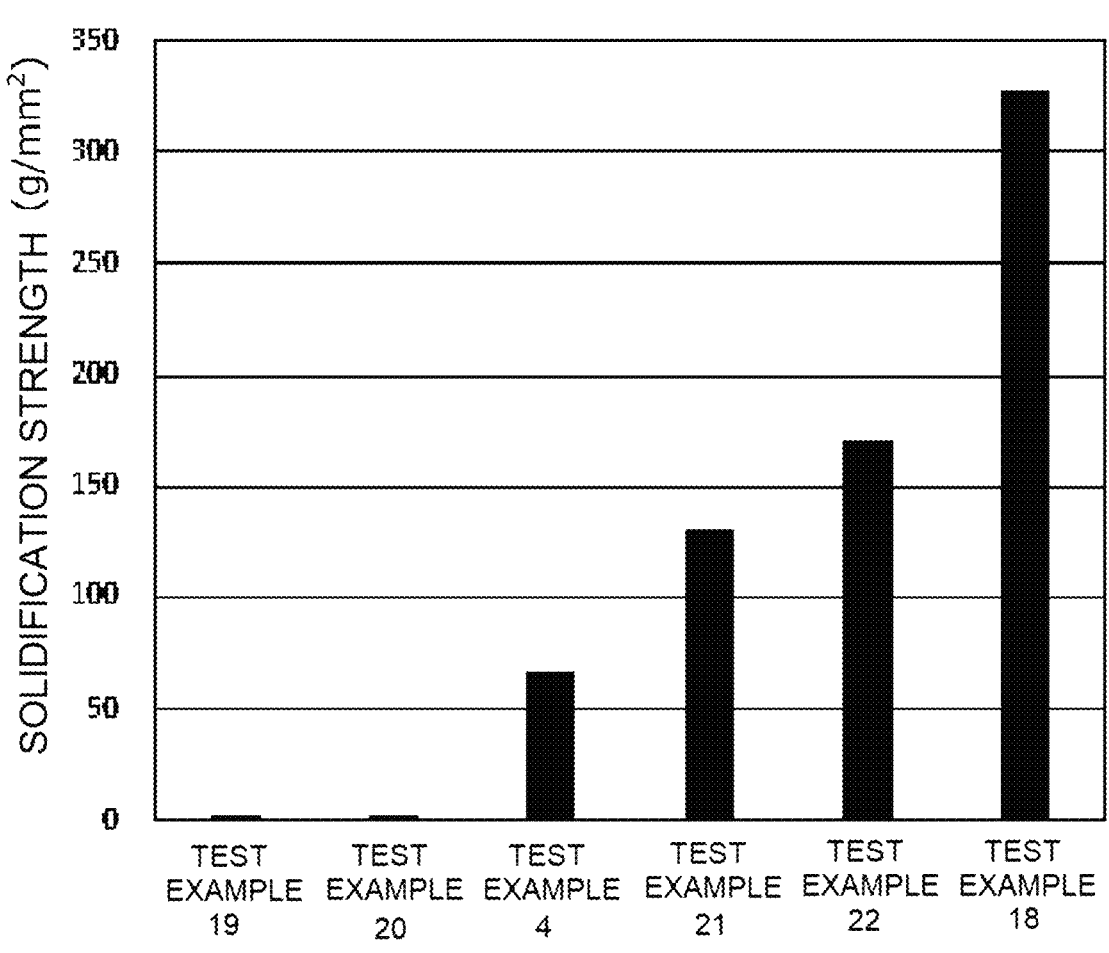
FIG. 4 is a graph showing the solidification strengths of the powdered soy sauces evaluated in Experimental Example 3.

The results of evaluation of the solidification resistance conducted in the same manner as in Experimental Example 1 are shown in Table 10 below. The results of the solidification strengths are also shown in FIG. 4.

(3) Evaluation of Taste

Persons in charge who had engaged in production/development of powdered soy sauces and who had professional knowledge ate the test samples and evaluated the presence or the absence of the soy sauce taste based on the following indicators. Here, C or better was considered as passing.

B: The sample has the soy sauce taste.

C: The soy sauce taste is felt although it is weak.

D: The sample does not have the soy sauce taste.

TABLE 10

| | Soybean Fiber Content (weight %) of Powdered Soy Sauce | Solidification Resistance | | | | |
|---|---|---|---|---|---|---|
| | | Solidification Strength | | Surface | Internal | |
| | | (g/mm$^2$) | (Evaluation) | State | State | Taste |
| Test Example 19 | 75.9 | 2 | A | A | A | D |
| Test Example 20 | 66.0 | 2 | A | A | A | C |
| Test Example 4 | 21.8 | 66.9 | B | B | A | B |
| Test Example 21 | 10 | 131.1 | C | C | A | B |
| Test Example 22 | 7.7 | 170.5 | C | C | A | B |
| Test Example 18 | 0 | 327.7 | D | D | B | B |

From the above results, it was found that, when soybean powder alone is used as an excipient, excellent solidification resistance is obtained when the soybean powder content of the powdered soy sauce is 6 mass % or more as a solid content. Moreover, when the content exceeded 70 mass %, the taste of the soy sauce became weak.

Experimental Example 4

In this Experimental Example, it was examined whether there was a difference in the solidification resistance of the powdered soy sauce or in the aspect ratios of particles of the powdered soy sauce between the case of addition of pea powder or soybean powder before powdering of the liquid soy sauce (also called pre-addition below) and the case of addition after powdering (also called later addition below), when pea powder or soybean powder was added to a liquid soy sauce.

In Experimental Example 4-1, it was examined whether there was a difference in the solidification resistance of the powdered soy sauce between the pre-addition and the later addition of pea powder or soybean powder.

In Experimental Example 4-2, it was examined whether there was a difference in the aspect ratios of particles of the powdered soy sauce between the pre-addition and the later addition of pea powder and soybean powder.

Experimental Example 4-1

(1) Preparation of Powdered Soy Sauces (Test Examples 1, 4 and 7 and Test Examples 23, 24 and 25)

As examples of powdered soy sauces obtained by pre-addition of pea fiber, soybean powder or dextrin, the powdered soy sauces of Test Example 1, Test Example 4 and Test Example 7 above, respectively, were used.

Moreover, as an example of a powdered soy sauce obtained by later addition of pea fiber, a powdered soy sauce of Test Example 23 prepared as shown below was used. That is, pea fiber was added to a powdered soy sauce obtained by heating a liquid soy sauce (a koikuchi (dark-colored) soy sauce, sodium chloride concentration 16% (w/v)) to 85° C. and spray drying with a Mobile Minor spray dryer (TM-2000 Model-A: manufactured by NIRO JAPAN) under the conditions of an inlet temperature of 150 to 160° C. and an outlet temperature of 90 to 95° C., and thus the powdered soy sauce of Test Example 23 was prepared (see Table 11).

In the same manner, soybean fiber or dextrin was added later to the powdered soy sauce produced by the above method, and powdered soy sauces of Test Example 24 and Test Example 25 were prepared (see Table 11).

Here, the amounts (g) of the pea fiber, the soybean fiber and dextrin added shown in Table 11 are the weights of the dry solid contents.

TABLE 11

| | | Pea Fiber | | Soybean Fiber | | Dextrin | |
|---|---|---|---|---|---|---|---|
| | | Test Example 23 | Test Example 1 | Test Example 24 | Test Example 4 | Test Example 25 | Test Example 7 |
| Pre-addition | Liquid Soy Sauce (ml) | 1000 | 1000 | 1000 | 1000 | 1000 | 1000 |
| | Excipient (g) | 0 | 100 | 0 | 100 | 0 | 100 |
| | Water (ml) | 0 | 200 | 0 | 200 | 0 | 200 |

TABLE 11-continued

| | | Pea Fiber | | Soybean Fiber | | Dextrin | |
| | | Test Example 23 | Test Example 1 | Test Example 24 | Test Example 4 | Test Example 25 | Test Example 7 |
|---|---|---|---|---|---|---|---|
| Later Addition | Excipient (g) | 100 | 0 | 100 | 0 | 100 | 0 |
| Excipient Content (weight %) of Powdered Soy Sauce | | 21.8 | 21.8 | 21.8 | 21.8 | 21.8 | 21.8 |

(2) Evaluation of Solidification Resistance

Figure 5:
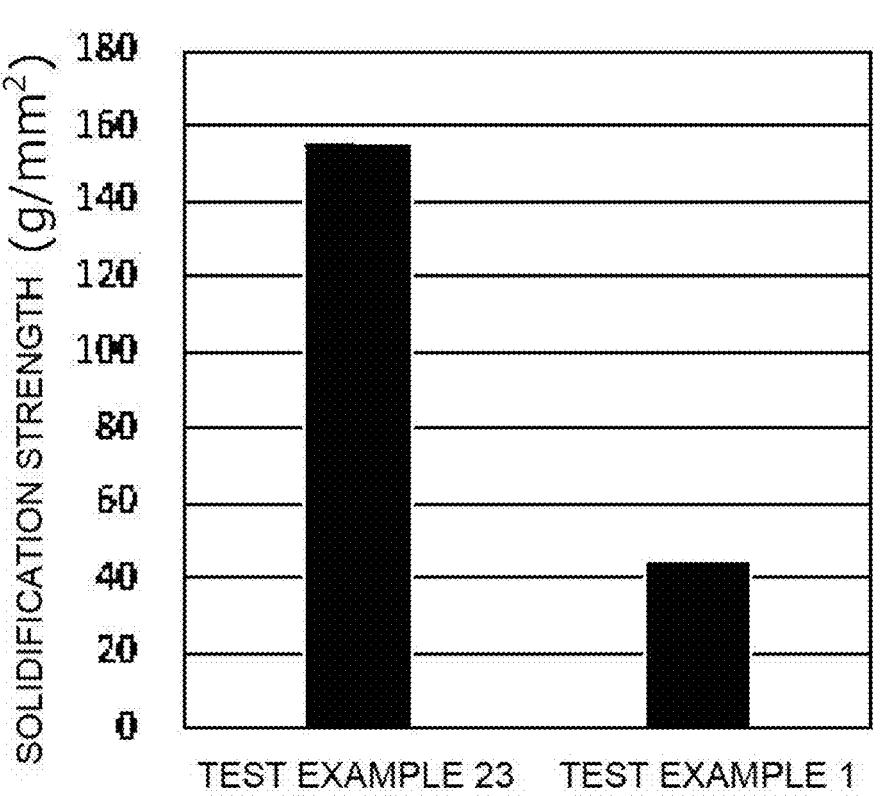
FIG. 5 is a graph showing the solidification strengths of the powdered soy sauces evaluated in Experimental Example 4.

The results of evaluation of the solidification resistance conducted in the same manner as in Experimental Example 1 are shown in Table 12 below. The results of the solidification strengths are also shown in FIG. 5.

TABLE 12

| | | | Solidification Resistance | | | |
| | | | Solidification Strength | | Surface | Internal |
| | | | (g/mm$^2$) | (Evaluation) | State | State |
|---|---|---|---|---|---|---|
| Test Example 23 | Pea Fiber | Later Addition | 155.0 | C | C | C |
| Test Example 1 | | Pre-addition | 44.8 | A | A | A |
| Test Example 24 | Soybean Fiber | Later Addition | 186.5 | C | C | C |
| Test Example 4 | | Pre-addition | 66.9 | B | B | B |
| Test Example 25 | Dextrin | Later Addition | 550.3 | D | D | B |
| Test Example 7 | | Pre-addition | 434.3 | D | D | B |

From the above results, it was found that addition of pea powder or soybean powder before powdering of the liquid soy sauce is more effective than addition after powdering to improve the solidification resistance.

Experimental Example 4-2

(1) Preparation of Powdered Soy Sauces Containing Pea Powder (Test Example 1 and Test Example 23)

The powdered soy sauce of Test Example 1 above was used as an example of a powdered soy sauce obtained by pre-addition of pea fiber, and the powdered soy sauce of Test Example 23 above was used as an example of a powdered soy sauce obtained by later addition of pea fiber (see Table 11).

(2) Preparation of Powdered Soy Sauces Containing Powder Containing Soybean Powder (Test Example 4 and Test Example 24)

The powdered soy sauce of Test Example 4 above was used as an example of a powdered soy sauce obtained by pre-addition of soybean fiber, and the powdered soy sauce of Test Example 24 above was used as an example of a powdered soy sauce obtained by later addition of soybean fiber (see Table 11).

(3) Preparation of Powdered Soy Sauces Containing Dextrin (Test Example 7 and Test Example 25)

The powdered soy sauce of Test Example 7 above was used as an example of a powdered soy sauce obtained by pre-addition of soybean fiber, and the powdered soy sauce of Test Example 25 above was used as an example of a powdered soy sauce obtained by later addition of dextrin as an excipient (see Table 11).

(4) Aspect Ratios

The powdered soy sauces were observed under a microscope, and 50 random particles were selected from each image taken. The minor axis sizes (widths) and the major axis sizes (lengths) of the selected 50 particles were measured with vernier calipers, and the aspect ratios of the particles of the powdered soy sauce were calculated. Then, the average of the aspect ratios was determined, and the average was regarded as the aspect ratio of the particles of the powdered soy sauce. The results are shown in Table 13.

As a reference, the aspect ratio of particles of a powdered soy sauce prepared in the same manner without addition of any excipient is also shown in Table 13.

Figure 6A:
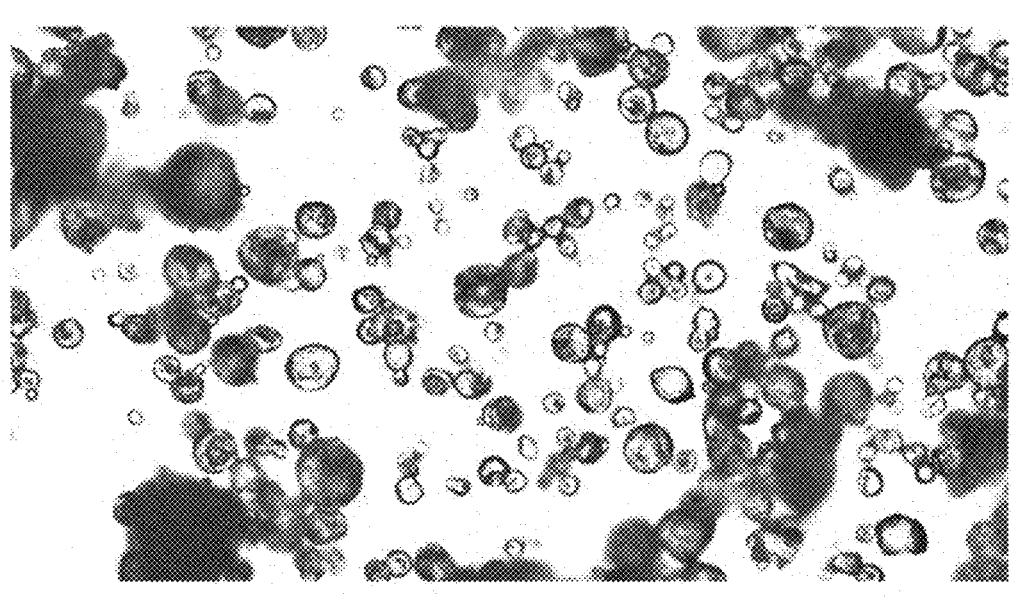
FIG. 6A is a microscopic image of a powdered soy sauce obtained by pre-addition of pea fiber in Experimental Example 4.
Figure 6B:
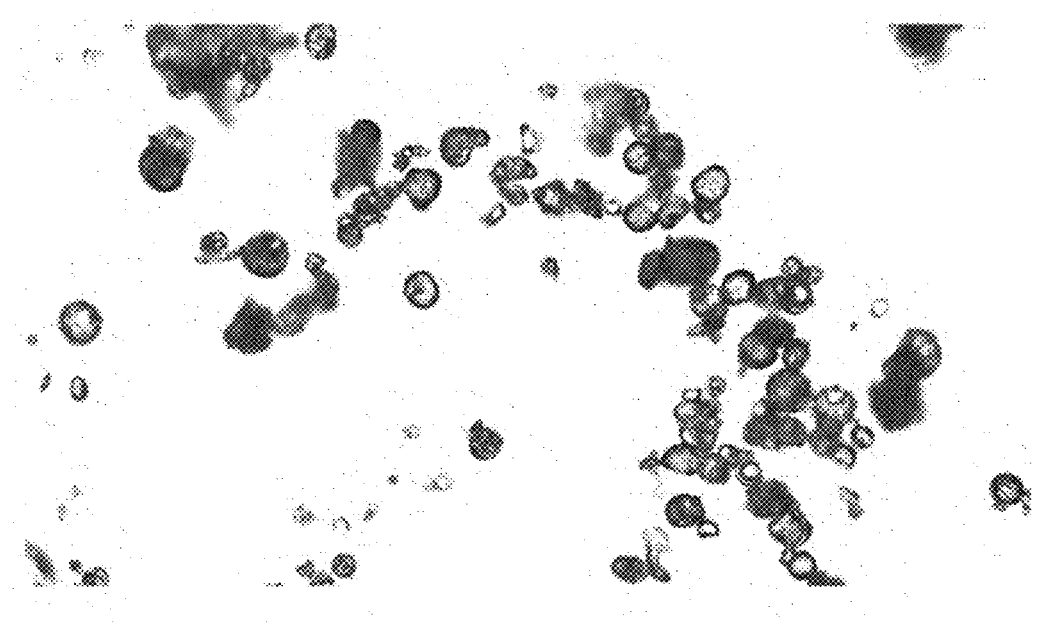
FIG. 6B is a microscopic image of a powdered soy sauce obtained by later addition of pea fiber in Experimental Example 4.

FIG. 6A is a microscopic image of the powdered soy sauce obtained by pre-addition of the pea fiber, and FIG. 6B is a microscopic image of the powdered soy sauce obtained by later addition of the pea fiber.

Figure 7A:
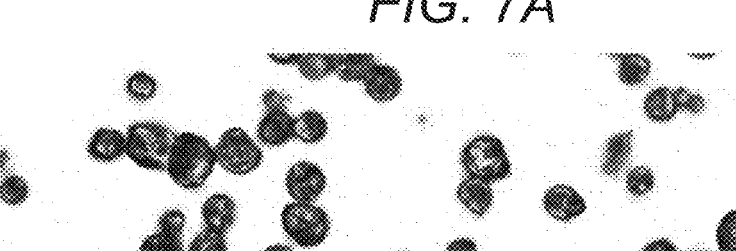
FIG. 7A is a microscopic image of a powdered soy sauce obtained by pre-addition of soybean fiber in Experimental Example 4.
Figure 7B:
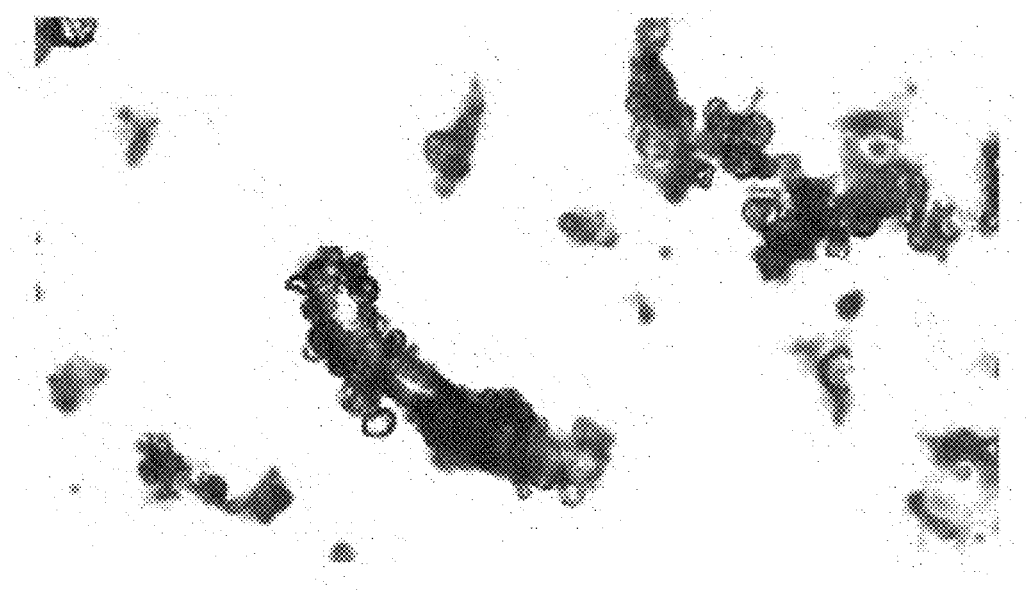
FIG. 7B is a microscopic image of a powdered soy sauce obtained by later addition of soybean fiber in Experimental Example 4.

FIG. 7A is a microscopic image of the powdered soy sauce obtained by pre-addition of the soybean fiber, and FIG. 7B is a microscopic image of the powdered soy sauce obtained by later addition of the soybean fiber.

TABLE 13

| Excipient | Pre-addition/ Later Addition | Average Minor Axis Size (mm) | Average Major Axis Size (mm) | Average Aspect Ratio |
|---|---|---|---|---|
| Pea Fiber | Pre-addition | 6.01 | 6.37 | 0.94 |
| | Later Addition | Not Measurable | Not Measurable | Not Measurable |
| Soybean Fiber | Pre-addition | 6.35 | 6.98 | 0.92 |
| | Later Addition | Not Measurable | Not Measurable | Not Measurable |
| Dextrin | Pre-addition | 5.34 | 5.43 | 0.98 |
| | Later Addition | Not Measurable | Not Measurable | Not Measurable |
| None | — | 8.14 | 8.35 | 0.97 |

As shown above, the powdered soy sauces obtained by pre-addition of the pea fiber or the soybean fiber had an aspect ratio of 0.85 or more. This is speculated to be because the pea powder or the soybean powder contained in the powdered soy sauces formed a particle together with the soy sauce components as shown in FIG. 6A and FIG. 7A.

On the other hand, the particles of the powdered soy sauces obtained by later addition of the pea fiber or the soybean fiber were not spherical but had irregular form, and thus the aspect ratios could not be measured. This is because, while the aspect ratio means the minor axis size (width)/ major axis size (length), an irregular particle has different sizes on one axis, and thus the major axis size and the minor axis size cannot be determined, which makes it impossible to measure the aspect ratio. As shown in FIG. 6B and FIG. 7B, this is speculated to be because the pea powder or the soybean powder contained in the powdered soy sauces did not form any particle together with the soy sauce components.

When the results of Experimental Example 4-1 and Experimental Example 4-2 are considered together, it was suggested that the solidification resistance of a powdered soy sauce is high when the aspect ratio of particles of the powdered soy sauce containing pea powder or soybean powder is 0.85 or more.

Although embodiments have been explained above referring to the drawings, it is needless to mention that the invention is not limited to the examples. It is obvious that one skilled in the art can reach modified examples or corrected examples within the scope described in the claims, and it is understood that the examples of course belong to the technical scope of the invention. The constituent features in the embodiments may be combined freely within the scope which does not deviate from the contents of the invention.

The present application is based on a Japanese patent application filed on Apr. 7, 2021 (patent application No. 2021-065487), and the contents thereof are incorporated in the present application by reference.

The invention claimed is:

1. A powdered soy sauce containing at least one of pea powder and soybean powder, wherein the pea powder contains 45 mass % or more of dietary fiber when present, and the soybean powder contains 45 mass % or more of dietary fiber when present, and wherein particles of the powdered soy sauce have an average aspect ratio of 0.85 or more.

2. The powdered soy sauce according to claim 1 which contains 8 mass % or more of the pea powder as a solid content based on the powdered soy sauce.

3. The powdered soy sauce according to claim 1 which contains 8 mass % or more of the soybean powder as a solid content based on the powdered soy sauce.

4. The powdered soy sauce according to claim 1, obtained by dry-powdering a liquid soy sauce, wherein the liquid soy sauce is obtained by adding at least one of the pea powder and the soybean powder to a liquid soy sauce.

5. The powdered soy sauce according to claim 1, wherein the pea powder or the soybean powder together with a soy sauce component is in the form of particles.

6. The powdered soy sauce according to claim 1, obtained by adding at least one of the pea powder and the soybean powder to a liquid soy sauce and then conducting dry-powdering process of the liquid soy sauce.

7. A method for producing a powdered soy sauce including adding at least one of pea powder and soybean powder to a liquid soy sauce and then conducting dry-powdering process of the liquid soy sauce, wherein the pea powder contains 45 mass % or more of dietary fiber when present, and the soybean powder contains 45 mass % or more of dietary fiber when present.

8. The method for producing a powdered soy sauce according to claim 7, wherein the water absorption rate of the pea powder is 500% or less.

9. The method for producing a powdered soy sauce according to claim 7, wherein the water absorption rate of the soybean powder is 600% or less.

* * * * *